INVENTOR:

Le Roy J. Leishman

TRANSMISSION OF COLORED TELEVISION IMAGES

Filed Oct. 22, 1951 5 Sheets-Sheet 2

INVENTOR.

Le Roy J. Leishman

April 23, 1957 LE ROY J. LEISHMAN 2,790,025

TRANSMISSION OF COLORED TELEVISION IMAGES

Filed Oct. 22, 1951 5 Sheets-Sheet 3

INVENTOR.

Le Roy J. Leishman

INVENTOR.

Le Roy J. Leishman

April 23, 1957 LE ROY J. LEISHMAN 2,790,025

TRANSMISSION OF COLORED TELEVISION IMAGES

Filed Oct. 22, 1951 5 Sheets-Sheet 5

INVENTOR.

Le Roy J. Leishman 2,790,025
Patented Apr. 23, 1957

1

2,790,025

TRANSMISSION OF COLORED TELEVISION IMAGES

Le Roy J. Leishman, Los Angeles, Calif.

Application October 22, 1951, Serial No. 252,504

18 Claims. (Cl. 178—5.4)

This invention pertains to natural color television and more particularly to means and methods for use at the transmitter for the elimination of fringing in the reproduced images.

In the field sequential systems of natural color television such as those discussed in my Patent No. 2,010,307, issued August 6, 1935, and recently approved with specific requirements as to field frequency, line frequency, color sequence, etc., by the Federal Communications Commission, the color separation images are independently transmitted in sequence for each of the three component colors. Particularly when a rotating color filter is used at the transmitter, objectionable color fringing appears in the reproduced images of rapidly moving objects. In order to eliminate color fringing completely there must be perfect registry of the three color separation values. This is of course always possible for images of stationary objects, but registration has not heretofore been achieved in the case of moving objects for the obvious reason that the object is in a different position when each successive color field is transmitted.

It has been proposed to minimize fringing by using three pickup tubes, each continuously exposed through a color filter to the scene being televised. While this proposal reduces fringing somewhat, the ideal condition of perfect registry is still not achieved because the color separation image on each tube is stored between successive scannings of that tube, and since the intervals between successive scannings are not concurrent for all the tubes, it necessarily follows that the images of moving objects will be different. The present invention makes it possible to eliminate color fringing completely. This is accomplished by exposing three color pickup tubes simultaneously and then intercepting the light beam while the image mosaics are being scanned, or at least while all of the scannings excepting the first of the series are taking place.

In one form of my invention, two sets of color pickup tubes are used. One set is exposed, and then, while the light falling on the tubes is intercepted, the scanning takes place. Meanwhile, the other set of color pickup tubes is being exposed. Substantially at the instant when the scanning of the first set of tubes is completed, the light falling on the second set of tubes is intercepted and then the scanning of this second set takes place while the tubes are in darkness.

Needless to say, this system of color television transmission requires the use of pickup tubes that store the photoelectric charge for a substantial period of time. Most mosaics exhibit this characteristic, some in more marked degree than others; but it is desirable in implementing the present invention that the charge be retained for a period of time at least equal to one complete cycle of image formation in all of the three colors.

Accordingly, the principal object of this invention is to provide improved means of transmitting television images in their natural colors.

Another object of the invention is substantially to eliminate color fringing from the reproduced images of rapidly moving objects.

2

Another object is to increase the sharpness of the received images by reducing the length of the exposure without changing the normal scanning cycle.

Another object is the provision of certain components that will facilitate the operation of the various components set forth in the claims.

Another object is to provide a method for accomplishing the foregoing which, while particularly adapted to field sequential systems of color television, may nevertheless be applied to other systems of reproducing television pictures in color.

Other objects will appear as the specification proceeds.

Figure 17:
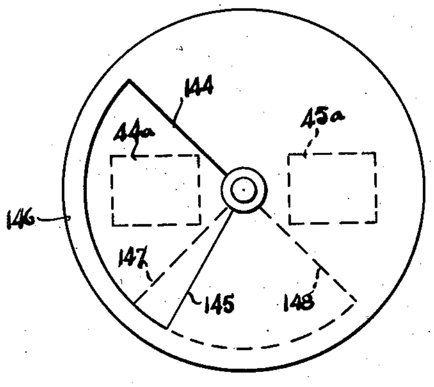
Figure 16:
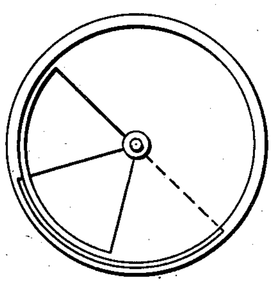
Figure 15:
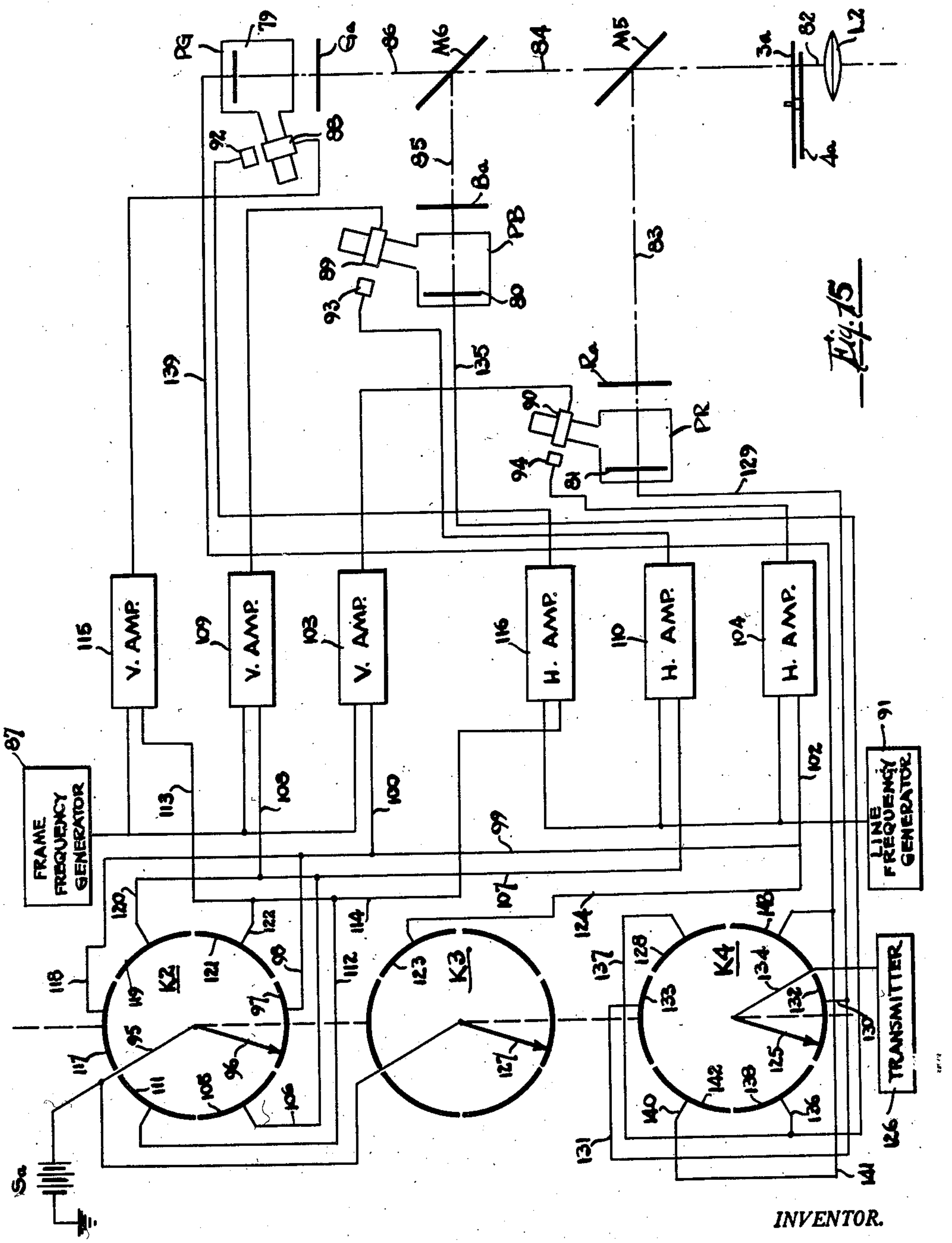

Fig. 15 diagrammatically illustrates another species of my invention which requires only three pickup tubes;

Fig. 16 shows a rotating vane arrangement that is particularly useful with the species of my invention illustrated in Fig. 15; and Fig. 17 shows another method for mechanically intercepting the light in the various illustrative embodiments of my invention hereinafter described.

Figure 1:
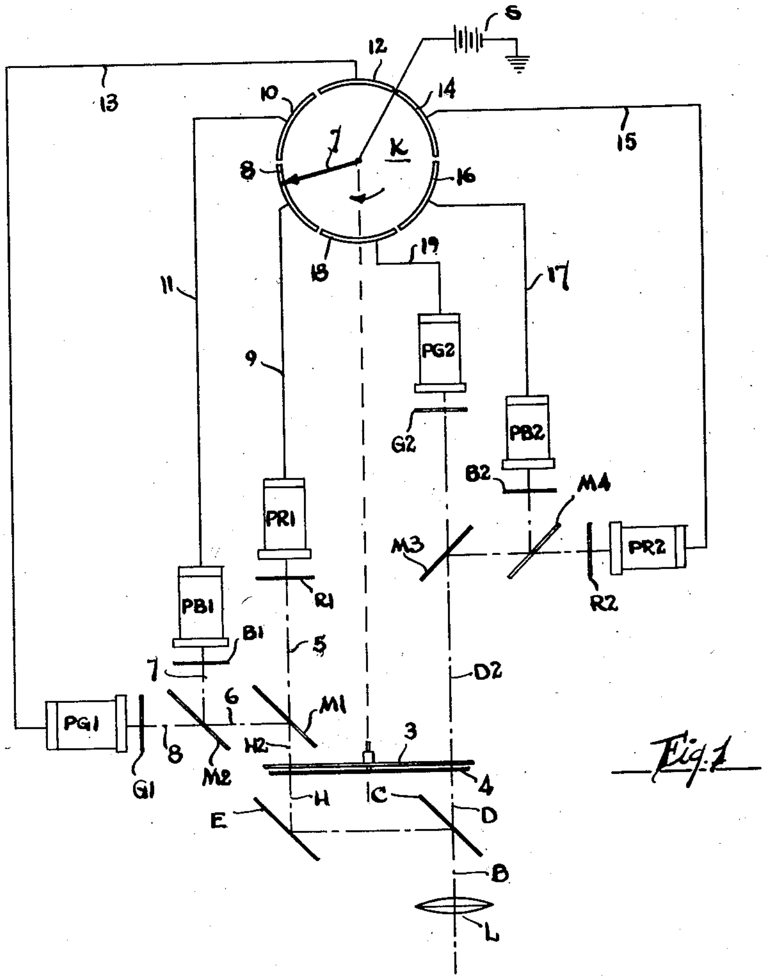
Figure 1 is a schematic representation of one form of my invention.

In the schematic representation of one embodiment of my invention shown in Fig. 1, the scene being televised is focused by means of a lens L upon six pickup tubes through a series of interposed mirrors. Beam B is initially split into two parallel beams D and H by means of the semi-transparent mirror C and the mirror E, the latter preferably being a first surface mirror. The rays that pass through mirror C emerges as beam D and the rays reflected from mirror E are designated as beam H. In one form of my invention the beams D and H are alternately intercepted by two rotating vanes 3 and 4, shown in greater detail and in their theory of operation in Figs. 3 to 9. In order to understand the basic principles of my invention, however, it is sufficient at this point merely to know that beam H is permitted to pass through these vanes for half of the time and that during the remaining half beam D is permitted to pass. These beams alternately emerge through the vanes as beams H2 and D2. Beam H2 strikes the semi-transparent mirror M1. A portion of the beam passes through this mirror as beam 5. Beam 5 is then transmitted through the red color filter R1 and falls upon the image pickup tube represented diagrammatically as PR1. The rays that are reflected by mirror M1 are designated as beam 6, which falls upon the semi-transparent mirror M2. The reflected portion of this beam, designated by the numeral 7, is transmitted through the blue color filter B1 and falls upon the mosaic of the pickup tube PB1. The rays that are transmitted through semi-transparent mirror M2 are transmitted through the green filter G1 and fall upon the mosaic of the pickup tube PG1. It will thus be seen that each of the three pickup tubes PR1, PB1 and PG1 are exposed simultaneously to the scene being televised, but that they are individually responsive only to the rays that pass through the respectively associated color filters.

After these tubes have been exposed for an interval approximately equal to one cycle of complete image formation, the beam H is intercepted and the tubes remain in darkness. The residual images on the mosaics of these tubes are then successively scanned. A biasing voltage to effect this sequential scanning is successively applied to each of the pickup tubes PR1, PB1, and PG1 from a source S, indicated diagrammatically. The biasing voltage is successively applied to these tubes through a commutating device K. This commutating device, or distributor, may be either mechanical, as indicated diagrammatically, or electronic, components of both types being well known in the art. It will be observed that the wiper 7, as shown in the figure, is biasing pickup tube PR1 through segment 8 and conductor 9. As brush 7 moves in the direction indicated by the arrow, tube PB1 will next be biased through segment 10 and conductor 11. After the wiper has left segment 10 it will engage segment 12 and bias the pickup tube PG1, through conductor 13. The output of these three tubes is applied to the transmitter in a conventional manner which is therefore not described here. It should be understood that a suitable amplifier or amplifiers may be interposed between the biasing source S and the various pickup tubes, and that suitable amplification may likewise be interposed between the tubes and the transmitter. Such amplifiers and their connections are well known in the art, and the diagram is consequently confined to representation of the novel features that are specific to this invention and to the components with which the novel features are associated.

While the mosaics of the tubes PR1, PB1, and PG1 are being successively scanned, the light path through the vanes 3 and 4 is open to the second set of pickup tubes PR2, PB2, and PG2. Beam D, having passed through the semi-transparent mirror C, and the light intercepting means 3 and 4, now becomes beam D2. A portion of this beam passes through the semi-transparent mirror M3 and the green color filter G2 and falls upon the mosaic of the pickup tube PG2. The remainder of beam D2 is reflected by mirror M3 and falls upon another transparent mirror M4, which reflects a portion and transmits the balance. The portion that is transmitted through mirror M4, passes through the red filter R2 and falls upon the pickup tube PR2, while the part of the beam that is reflected by mirror M4 is transmitted through the blue color filter B2 and falls upon pickup tube PB2.

As soon as the scanning of the first set of mosaics is complete, the light intercepting means 3 and 4 closes the light path to the second set of pickup tubes and again opens the light path of the first set. During the next ensuing half cycle, the mosaics of the second set of pickup tubes are successively scanned. The biasing voltage to effect the scanning of pickup tube PR2 is supplied to this tube through conductor 15 when the wiper 7 reaches segment 14. Tube PB2 is next appropriately biased through segment 16 and conductor 17, after which the bias is applied to pickup tube PG2 through segment 18 and conductor 19. Upon completion of the scanning of the mosaics of tubes PR2, PB2 and PG2, the light path to these tubes is again opened by the vanes 3 and 4, which now intercept beam H during the ensuing half cycle in which the mosaics of the first set of pickup tubes are again scanned.

As indicated in the figure, the cycle of commutation is of course synchronous with respect to the operation of the light-intercepting means 3 and 4.

Although the foregoing explanation of one embodiment of my invention has indicated that the color separation is effected by means of semi-transparent mirrors and filters, I nevertheless contemplate the employment of any other means well known in the art for effecting the color separation; for example, color-selective reflectors or dichroic mirrors may be used.

Although my invention contemplates interlacing, no provision for interlacing is shown in Fig. 1. Such interlacing may be accomplished by the modified commutating arrangement indicated in Fig. 2, in which conductors 9*a*, 11*a*, 13*a*, 15*a*, 17*a*, and 19*a* correspond to the conductors designated by the same numbers, but without the letter, in Fig. 1. These conductors are connected to the pickup tubes in the manner indicated in Fig. 1. It will be noted that there are twice as many segments in this diagrammatic representation as there are in Fig. 1, and that the conductors 9*a* to 19*a* are respectively connected to two segments instead of one, as in Fig. 1. The segments 8*a*, 10*a*, and 12*a* correspond respectively to segments 8, 10, and 12 in Fig. 1.

After brush 7*a* has swept over segments 8*a*, 10*a*, and 12*a*, it engages segment 8*a'*, which is connected by conductor 20 to conductor 9*a*. This again biases pickup tube PR1 for the scanning of the lines omitted during the initial scanning of the mosaic, when contact 7*a* was in engagement with segment 8*a*. Segment 10*a* is connected in similar manner by conductor 21 to conductor 11*a* so that tube PB1 will again be biased for scanning the lines omitted during the first scanning of the mosaic of this tube. Segment 12*a* is connected to conductor 13*a* by means of conductor 22 so that the engagement of brush 7*a* with segment 12*a* will bias tube PG1 for the scanning of the lines initially omitted.

It will be noted that conductors 12*a*, 17*a*, and 19*a* are likewise connected to two different segments so that tubes PR2, PB2 and PG2 may be connected into the circuit at the proper intervals for interlaced scanning.

Figure 2:
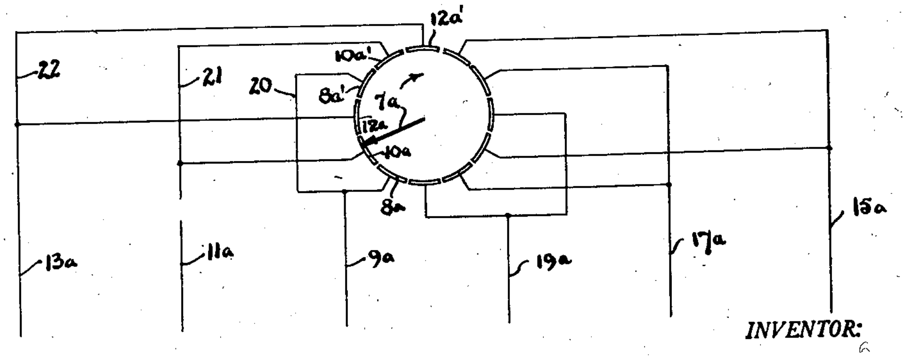
Fig. 2 shows a modification for providing line interlacing.

As in the case of the circuits of Fig. 1, the commutating necessary for the type of interlaced scanning provided for in Fig. 2 may be effected electronically instead of mechanically. Such electronic scanning per se is not described herein because it forms no portion of this invention excepting when it is used in combination with the other elements with which cooperation is required.

In using either of the embodiments of my invention hereinbefore disclosed, it is advisable that precautions be taken to keep the scanning beam from removing the charge on lines of the mosaic adjacent to those being scanned. A mosaic having a comparatively very large number of light-sensitive cells or droplets will help in this respect, as will also a scanning beam of very fine cross-section.

Figs. 3 to 9 illustrate a suitable means for alternately intercepting the light beams of the two sets of pickup tubes hereinbefore described. The vanes 3 and 4 each comprise opposite quadrants joined at the center. These segments are rotated synchronously in opposite directions by any suitable means such as, for instance, the mitre gear arrangement illustrated in Fig. 10. It will be noted in Fig. 10 that disc or vane 4 is connected to a central member 23, which has an enlarged portion 24 at the internal end for rigidly mounting a mitre gear 25. Beyond the enlarged portion 24, member 23 is again reduced in order to be received in a ball bearing 26. This bearing is housed in an externally threaded member 27, which is threaded into a housing 28 that surrounds all the gears. Disc 3 is connected to flange 29, which is integral with sleeve 30 surrounding the central member 23. Mitre gear 31 is rigidly mounted on sleeve 30 and a ball bearing 32 is provided for this sleeve. Ball bearing 32 is mounted in a threaded member 33 which is similar to threaded member 27 at the opposite end of the gear assembly. Threaded member 33 is threadedly mounted in the housing 28.

A third gear 34 meshes with gears 25 and 31. Gear 34 is rigidly mounted on shaft 35, which is journaled within the elongated threaded member 36 by means of ball bearings 37 and 38. Member 36, like members 27 and 33, is threadedly mounted in the housing 28.

In order to obtain the most ideal meshing situation between the three gears, the gears may be moved by screwing members 27, 33, and 36 in and out of the housing 28. Members 27 and 33 may be locked in adjusted position by means of screws 39 and 40 respectively, and member 36 may be locked in adjusted position by means of the nut 41. Member 35 is of course the driving shaft and with the gear arrangement just described it will be obvious that its rotation causes the vanes 3 and 4 to rotate synchronously in opposite directions.

Figure 5:
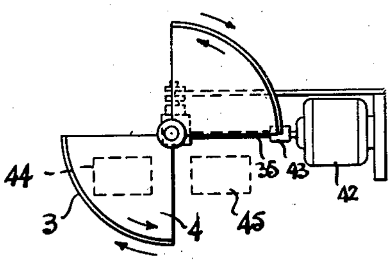
Figure 6:
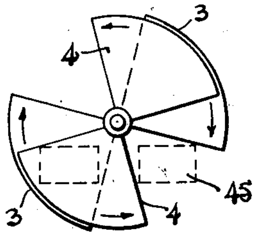
Figure 7:
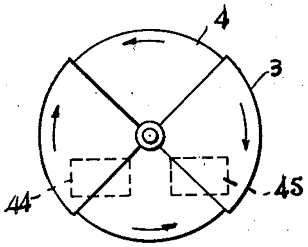
Figure 9:
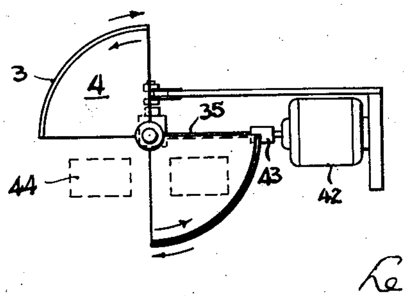
Figure 10:
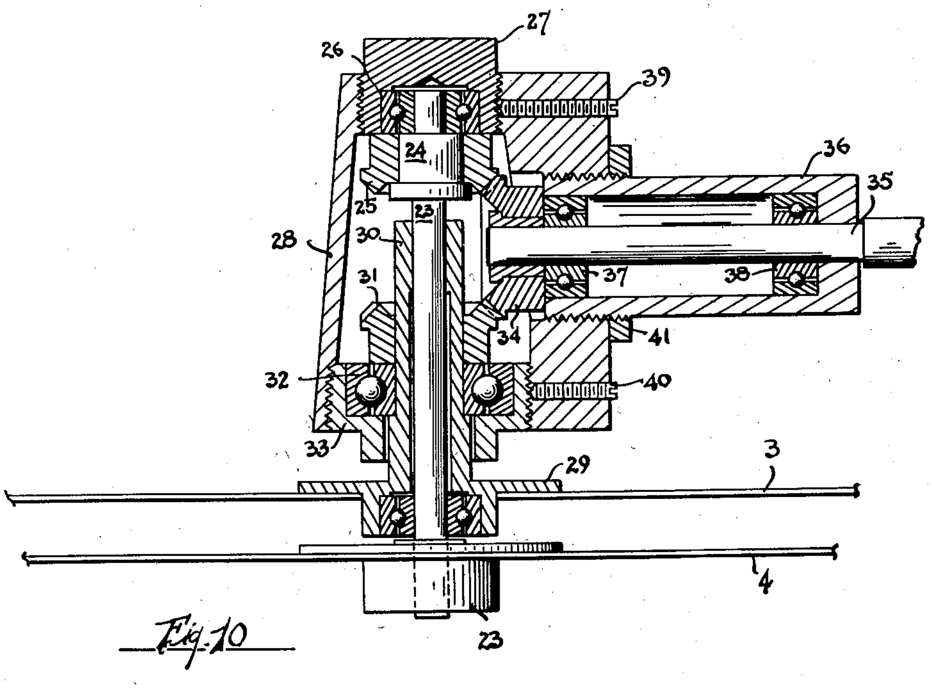
Fig. 10 shows a gear box embodying mitre gears for rotating the vanes of Figs. 3 to 9 in opposite directions simultaneously.

Shaft 35 is driven by means of motor 42, Figs. 5 and 9, to which the shaft is connected by means of a coupling 43. This motor may of course be an impulse motor or a synchronous motor, and the standard speed of rotation of the vanes 3 and 4 may be controlled by any appropriate arrangement interposed between the motor and the vanes themselves, such as, for instance, by using bevel gears of suitable ratio instead of mitre gears and thereby varying the speed of rotation betwen gear 34 and gears 25 and 31. It will also be understood that it is not necessary to use gears for rotating the vanes 3 and 4 synchronously in opposite directions, but that any other appropriate driving means may be employed, such as suitably toothed belts.

Figure 3:
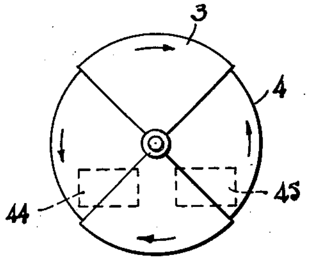
Figs. 3 to 9 illustrate different positions of the rotating vanes that constitute one form of an important component of my invention, each of these seven figures showing the vanes in different rotative positions.

The dotted rectangles 44 and 45 in Figs. 3 to 9 represent the area through which beams H and D, Fig. 1, respectively pass. When the vanes are in the position shown in Fig. 3 it will be clear that both of these areas are closed, thus intercepting both beams. The position of the discs shown in Fig. 3 is thus a transitional position at the instant when area 44 has just been closed and area 45 is about to open; in other words, it is the position of discs 3 and 4 at the instant when the pickup tubes PR1, PB1 and PG1, have just been exposed and are about to be scanned and tubes PR2, PB2 and PG2 have just been scanned and are about to be exposed.

Figure 4:
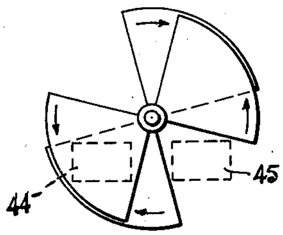
Figure 8:
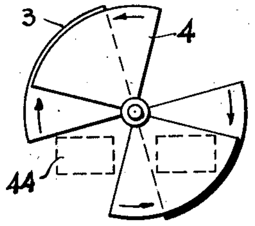

When the discs, turning in the direction of the arrows from the position shown in Fig. 3, reach the position shown in Fig. 4, the area 45 will be entirely open and the area 44 of course will remain closed. When the area 45 has thus been opened the beam D, Fig. 1, will be completely admitted between the adjoining segments of the two discs, thus exposing the mosaics of tubes PR2, PB2 and PG2 to the images reflected and transmitted by the mirrors M3 and M4. As the discs turn still further in the direction indicated by the arrows, they will reach the position shown in Fig. 5, which is a position 45° from that shown in Fig. 3. In the Fig. 5 position area 45 is still open and area 44 is still closed. As the discs continue to rotate they will begin to close in on area 45 when they have reached the position shown in Fig. 6. The rotation of the discs through an angle of 45° from the position shown in Fig. 5 will cause them to reach the position shown in Fig. 7, in which the area 45 is completely closed and area 44 is about to open. Fig. 8 shows area 44 completely open, and it will not again close until after the vanes have moved past the position shown in Fig. 9 to a position in which the vanes will begin to intercept area 44.

From the foregoing description of the operation of these vanes it will be clear that some light reaches each set of tubes during the entire half cycle in which they are storing a charge, and that the entire beam is permitted to pass for the greater portion of the half cycle. Although this arrangement thus does not permit all of the available light to reach a given set of pickup tubes during a complete half cycle, it nevertheless completely intercepts the beam during the opposite half cycle, thus achieving the important objective of screening the mosaics from light during the entire time in which these mosaics are being scanned. This arrangement thus permits successive scanning, but the images that are transmitted will nevertheless register perfectly, irrespective of how fast the televised objects may be moving—because the exposures are simultaneous.

Figure 11:
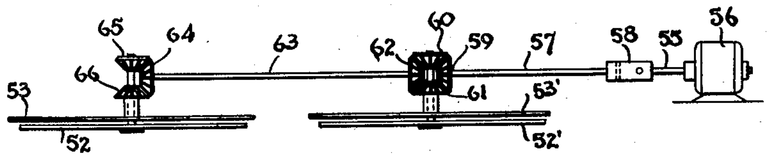
Figs. 11, 12 and 13 show a modified vane arrangement for performing the function of the vanes shown in Figs. 3 to 9, the vanes of the higher numbered figures making it possible to traverse a beam for interception purposes at a higher rate of speed.
Figure 13:
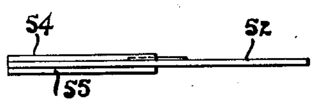
Figure 12:
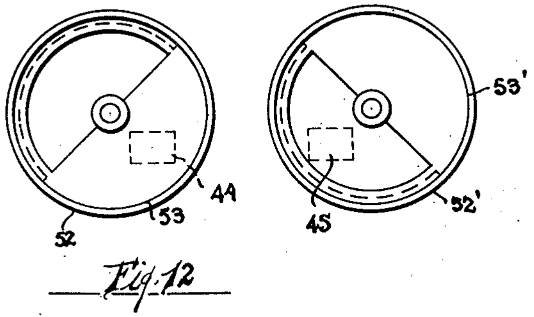

It is of course not essential that the beams to the two sets of pickup tubes be alternately intercepted by the specific means hereinbefore disclosed. Any arrangement for accomplishing this purpose will enable those skilled in the art to practice my invention. Figs. 11, 12, and 13 disclose an alternative arrangement for alternately intercepting the beams.

In this modified disc structure, the discs 52 and 53, as well as 52' and 53' are provided with semi-circular openings. Optically, these discs would be satisfactory if they were semi-circles; but inasmuch as such a structure would induce serious vibration and cause excessive wear in the bearings, I prefer to retain the rim on the discs to serve as a means of attaching weights 54 and 55, Fig. 13, to bring the discs into proper balance. The weights 54 and 55 may appropriately be made of lead which may be cut away to bring the discs into dynamic balance.

Inasmuch as there is only one open segment in each of these discs, they must rotate at twice the speed of rotation of the discs previously described for a given number of color fields per second. They have the advantage, however, of opening and closing twice as fast as the discs previously discussed. This enables them to pass light for a longer period of time.

There must be two pairs of these discs, one pair for each beam. The pair that would be used for beam D, Fig. 1, are discs 52' and 53'. The angular position of these discs indicated in Fig. 12 is a position 90° from the position which they occupy when one of the areas 44 and 45 has just been closed and the other is about to open.

The two pairs must, of course, be properly coordinated and synchronized. One suitable means of driving them and keeping them in proper phase relationship is shown in Fig. 11, where the shaft 55 of motor 56 is connected to shaft 57 by means of coupler 58. A mitre gear 59 is rigidly attached to shaft 57. This gear drives the oppositely rotating gears 60 and 61 in the manner already described in connection with the gears shown in Fig. 10. In the present arrangement, an additional gear 62 meshes with gears 60 and 61 and gear 62 is rigidly mounted on a shaft 63, the axis of which is in line with the axis of shaft 57. The opposite end of shaft 63 carries another rigidly mounted mitre gear 64 which drives the gears 65 and 66. The oppositely rotating mitre gears 65 and 66, and 60 and 61, drive the respectively connected rotating vanes in the same manner as do the mitre gears shown in Fig. 10. The two pairs of discs may of course be driven by independent motors, in which case means must be employed for phasing one with respect to the other. Suitable means for this purpose, however, are well known in the art and are consequently not described here.

Figure 14:
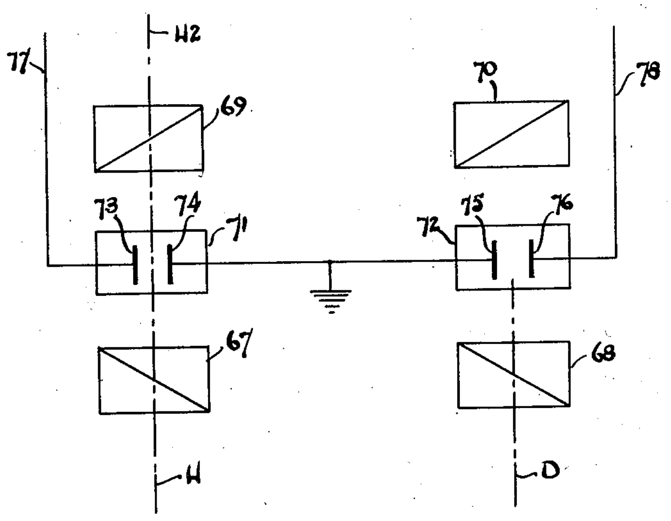
Fig. 14 illustrates an electric means for alternately intercepting the beam.

It is of course possible to alternately intercept the beams D and H of Fig. 1 by electrical means, thus avoiding the necessity of providing quiet operation for the gears or other driving means. Fig. 14 shows one electrical arrangement that may be employed for this purpose. This system uses polarized light and therefore results in reduced light intensity, but in the present state of the art this may be compensated for by more sensitive mosaics or by greater illumination of the scene being televised.

In the Fig. 14 arrangement, the numerals 67 and 68 indicate polarizers while 69 and 70 designate analyzers. The cells 71 and 72 each comprise a dielectric interposed between plates to which suitable potentials may be applied for rotation of the plane of polarization of the light passing from the polarizer to the analyzer. In cell 71 these plates are designated by the numerals 73 and 74 while plates 75 and 76 are the corresponding elements in cell 72. Many substances have been found which will rotate the plane of polarization under magnetic or electrostatic stress when interposed between a polarizer and an analyzer, and it is not necessary for the purposes of this invention that any specific diaelectric be used. Opposite potentials of suitable value are applied to the conductors 77 and 78 connected respectively to plates 73 and 76. The cells 71 and 72 may be oriented with respect to the polarizers and analyzers so that they will either pass or reject the light from the polarizers when there is no charge on the plates, or they may be so arranged that the light is either accepted or rejected when the plates are charged. As shown in the figure, beam H is passing between plates 73 and 74 and emerges from analyzer 69 and beam H2. Beam D, on the other hand, is indicated as stopped by cell 72 and it is consequently not transmitted through the analyzer 70. The opposite potentials of conductors 77 and 78 may be supplied by an alternating current source or by a special generator designed to provide a wave with a flat top so that the potentials will remain fairly uniform for the greater portion of a half cycle. Such a wave form is preferable, of course, when the cells 71 and 72 are arranged to transmit light during the period when the plates are charged.

The arrangement shown in Fig. 14 is not the only all electric means that may be employed for the purposes described. Other light valves are well known and may be optionally used for alternately intercepting the beams.

Fig. 15 illustrates a species of my invention employing only one set of pickup tubes. In this species the scanning of the three mosaics 79, 80, and 81 is done in sequence, but they are exposed to light for substantially only one-third of the time if the scanning is not interlaced, or for substantially one-sixth of the time if interlacing is employed. The commutators indicated at the left of the picture, however, are illustrative of an arrangement suitable for interlaced scanning according to the pattern currently approved by the Federal Communications Commission for the transmission of television in color. The following description will accordingly be confined to the steps involved in such interlaced scanning, but it is to be understood that suitable modifications may be made for scanning all of the lines in each frame in sequence.

For the embodiment of my invention illustrated in Fig. 15, the light intercepting means should permit light to pass for only substantially one-sixth of the time. Suitable oppositely rotating discs for this purpose are shown in Fig. 16. These discs each have a single open segment of approximately 120°, but inasmuch as they are intended to be rotated in opposite directions by some such means as hereinbefore disclosed, it should be clear that only 60° of rotation is required to move the discs from a completely open to a completely closed condition. The discs 3*a* and 4*a* of Fig. 15 may for purposes of illustration be considered to be of this type.

During the portion of the cycle of operations when the light intercepting means 3*a* and 4*a* of Fig. 15 is passing light, the scene will be focused by lens L2 upon the three mosaics 79, 80 and 81 by way of the intervening semi-transparent mirrors M5 and M6 and the filters R*a*, G*a* and B*a*. Beam 82, after passing through the light intercepting means, falls upon mirror M5. A portion of this beam is reflected as beam 83 by mirror M5 through the color filter R*a* upon the mosaic 81 of pickup tube PR. The portion of the rays that is transmitted through semi-transparent mirror M5 emerges as beam 84. A portion of beam 84 is reflected by the semi-transparent mirror M6 through filter B*a* upon the mosaic 80 of tube PB. These reflected rays from mirror M6 are designated by the numerals 85. The rays 86 that are transmitted through the semi-transparent mirror M6 fall upon filter G*a* and the green rays transmitted therethrough are received upon the mosaic 79 of the pickup tube G*a*.

In the arrangement diagrammatically shown in Fig. 15, it may be assumed that light is received by the three mosaics during the portion of the scanning cycle when the odd numbered lines of the red color separation image upon mosaic 81 are being scanned. Mechanical or electrical commutation controls the required scanning sequence. It is thus to be understood that while mechanical switching is indicated, the switching function may be performed electronically, or in any other way that obtains the same end result.

As shown in the figure, the frame frequency generator 87 is connected to the vertical deflecting elements 88, 89, and 90 through individual amplifiers, although it is to be understood that it is not essential that separate amplifiers be employed. In the arrangement indicated in the figure, the line frequency generator 91 is connected to the horizontal deflecting elements 92, 93, and 94 by way of individual amplifiers which, as in the case of the vertical amplifiers, may be replaced by a single amplifier with suitable provisions for applying the necessary activating potentials to the respective pickup tubes during the portions of the operating cycle when their mosaics are being scanned.

The biasing potential from source S*a* is distributed by the commutator K2 to the respective vertical and horizontal amplifiers by means of conductor 95 and the brush or wiper 96.

In the arrangement indicated, the commutator K2 is provided with six segments, and brush 96 is shown in engagement with segment 97. This segment is connected by means of conductors 98, 99, 100 and 102 to the vertical and horizontal amplifiers 103 and 104, which respectively operate the vertical and horizontal deflecting elements. When wiper 96 is in engagement with segment 97, the odd numbered lines of the red separation image on mosaic 81 are accordingly scanned. When wiper 96 reaches segment 105, the actuating voltage is applied through conductors 106, 107, and 108 to the vertical and horizontal amplifiers 109 and 110, which respectively actuate the vertical and horizontal deflecting elements 89 and 93 of the pickup tube PB. The even numbered lines of the blue separation image on mosaic 80 are accordingly scanned during this interval. When wiper 96 reaches segment 111, the biasing voltage for pickup tube PG is applied through conductors 112, 113, and 114 to amplifiers 115 and 116, which control the scanning of mosaic 79 of the pickup tube PG. During this interval, the odd numbered lines of the green separation image on mosaic 79 are scanned.

When brush 96 reaches segment 117, the activating voltage is applied for the second time to amplifiers 103 and 104 through conductor 118, which is connected to conductor 99. The connection of conductor 99 to amplifiers 103 and 104 through the intermediate conductors 100 and 102 has already been described. These amplifiers, 103 and 104, as previously mentioned, control the deflecting elements 90 and 94 of the pickup tube PR. When the brush 96 is on segment 117, the even numbered lines on mosaic 81 which were omitted in the scanning of the first red field, are accordingly scanned. Wiper 96 next engages segment 119, connected by conductor 120 to conductor 107, which is directly connected to amplifier 110 and indirectly connected through conductor 108 to amplifier 109. Amplifiers 109 and 110, as previously described, control the operation of deflecting elements 89 and 93. The odd numbered lines on mosaic 80 are scanned when the activating voltage is applied through segment 119 in the manner just set forth.

The final field in the complete color frame comprises the even numbered lines on the green separation image on mosaic 79 of pickup tube PG. This final field is scanned when the wiper 96 is in engagement with segment 121. This segment is connected by means of conductor 122 to conductor 113, whose connections to amplifiers 115 and 116 have previously been described.

Inasmuch as the color separation images were actually impressed upon the mosaics during substantially the entire one-sixth cycle roughly corresponding to the period during which the odd numbered lines on mosaic 81 were being scanned, it follows that additional light will have been received on the greater portion of these lines on mosaic 81 after they were respectively scanned. Unless the scanning beam has a very small cross section, the residual charge on these lines is likely to be discharged when the even numbered lines are scanned; but if the beam has a very small cross section the residual charge may remain on the odd numbered lines after the intervening lines have been traversed by the scanning beam. Unless this residual charge is dissipated, it will remain upon the mosaic during its subsequent exposure for the red separation image on the succeeding color frame. This would cause blurring and result in a certain amount of fringing in the reproduced images of rapidly moving objects—a difficulty which the present invention is intended to overcome. Means are accordingly provided to dissipate this charge. Such means includes a second commutator K3 which applies an activating potential to amplifiers 103 and 104 while the odd numbered lines in the blue or green separation images are being scanned. As shown in the figure, the only segment of K3 that is connected in circuit is segment 123. This segment is connected by conductor 124 to amplifiers 103 and 104 through the interconnected wires 99, 100, and 102. Inasmuch as these amplifiers control the operation of deflecting elements 90 and 94, an additional scanning of mosaic 81 is effected during this period. Of course the charge that is thus dissipated from mosaic 81 must not reach the transmitter. To prevent this, an additional commutator K4 is introduced. The three mosaics 79, 80 and 81 are connected to the segments of this commutator in such a manner that the wiper 125 will connect them to the transmitter 126 only during the intervals when the color images that are to be transmitted are being scanned. There is accordingly no connection through the commutator K4 from mosaic 81 during the time that the residual charge upon this mosaic is being dissipated. As previously explained, this second scanning of the odd numbered lines on mosaic 81, which dissipates the residual charge, takes place while brush 127 of commutator K3 is in engagement with segment 123. As indicated in the figure, the operation of all these commutators is coordinated, and the brushes 96, 125, and 127 are accordingly always in engagement with corresponding segments of the respective commutators. It will be noted that when segment 123 of commutator K3 is engaged by brush 127 in order to activate the pickup tube PR through amplifiers 103 and 104, there is no simultaneous connection between brush 125 and the segments of commutator K4 that are connected to this tube. The residual charge on mosaic 81 consequently never reaches the transmitter.

Each of the mosaics is connected to two opposite segments of commutator K4. Thus, mosaic 81 is connected by conductors 129, 130 and 131 to the opposite segments 132 and 133. These are in turn connected by wiper 125 and conductor 134 to the transmitter 126 during the intervals when the first and second frames of the red separation image are being transmitted. Mosaic 80 is connected in a similar manner by conductors 135, 136 and 137 to the opposite segments 128 and 138. These are connected to the transmitter by brush 125 while the two frames of the blue separation image are being scanned. In a similar manner mosaic 79 of the pickup tube PG is connected by conductors 139, 140 and 141 to the opposite segments 142 and 143. The coordination or synchronous operation of brushes 127 and 125 thus permits the various color fields to be transmitted at the proper intervals, but inasmuch as tube PR has no connection to a live segment of commutator K4 during the time that brush 127 of commutator K3 is in engagement with segment 123, there is accordingly no transmission of the residual image that is discharged from mosaic 81 after its initial scanning.

After the cycle of operation hereinbefore described has been completed, the light path for beam 82 is again opened by discs *3a* and *4a* and the mosaics are again simultaneously exposed. The scanning of their color separation images, however, takes place after the beam is intercepted; and despite the fact that the scanning is done in sequence, the exposures that produce the color separation images are nevertheless simultaneous. As a result there is no opportunity for fringing.

Inasmuch as the exposure is much shorter when using the apparatus of Fig. 15 with the scanning pattern currently approved by the Federal Communications Commission than is the exposure time in the species of my invention illustrated in Fig. 1, it necessarily follows that the species of Fig. 15 will produce sharper images. It is necessary, however, to compensate for the smaller amount of light received by the mosaics by using more sensitive mosaics or greater amplification.

It will doubtless be obvious from the foregoing description that the instant invention provides a means, heretofore lacking in television, for controlling the sharpness of images of moving objects by means of the length of the exposure, as is done in still photography. With appropriate amplification, the exposure interval may be still further reduced from that suggested in the foregoing description of the apparatus illustrated in Fig. 15. In a similar manner, the length of the exposure may be reduced when using the species of Fig. 1. In the Fig. 1 species, it will be remembered that the exposure was continuous for a time period equal to that required for the transmission of a complete color frame. When using the pattern currently approved by the Federal Communications Commission, this interval would of course be $\frac{1}{24}$ of a second. The scanning, however, in the Fig. 1 species is nevertheless accomplished while the tubes are in darkness, as the employment of two sets of tubes in this arrangement permits the scanning of one set of mosaics in complete darkness while the other set of mosaics are being exposed.

Fig. 17 shows a mechanical intercepter suitable for use, with only slight modifications, in either of the embodiments of my invention hereinbefore disclosed. This consists of a single disc with an open segment extending from edge 144 to edge 145. Rim 146 subtends this open segment in order to permit dynamic balancing in the manner disclosed in connection with the description of Fig. 13. When used with two groups of image pickup tubes, it is necessary that this opening be smaller, angularly, than the space between the areas 44*a* and 45*a* which represent the cross section of the beams H and D respectively of Fig. 1, as well as the corresponding areas 44 and 45 of Figs. 3 to 9. This requirement as to the width of the opening enables the opening to completely clear one of the areas before beginning to enter the other. That this condition is met by the construction indicated in Fig. 17, is shown by dotted lines 147 and 148 representing the positions that the sides of the segments would occupy if interposed between the areas 44*a* and 45*a*. Without the use of gearing, it is thus possible to construct a mechanical intercepter that will meet the requirements of the embodiment illustrated in Fig. 1. In that embodiment it will be remembered that it is essential that all of the scanning be done while the mosaics are in darkness. It will be observed that the angular extent of the solid portion of the disc is sufficient to meet this requirement. It is also essential that a disc constructed according to Fig. 17 be so designed that neither of the areas will be open for longer than one-half of the time. This disc also meets this requirement.

When used with the embodiment illustrated in Fig. 15, there is of course only one beam to be considered. Area *44a*, of Fig. 17 may be taken as a representation of this single beam. The width of the open segment should be such that light passes through the disc during a period not substantially greater than that required for the scanning of a single color field.

The embodiments hereinbefore described and the various components that have been illustrated are only representative, and it will be understood by those skilled in the art that different components may be substituted for any of those suggested, and that under such circumstances there is no departure from the invention if the substituted elements perform the function of those omitted:

My claims are:

1. Means for transmitting television images in a plurality of colors, said means comprising: a plurality of image pickup tubes; means for simultaneously focusing rays from the scene being televised upon the mosaics of said tubes; means for filtering undesired colored rays from the band of rays reaching each tube, so that each tube will receive rays that are predominantly of a selected color; means for intermittently shielding said tubes from light rays from said scene; and means for scanning the mosaics of said tubes during the interval in which they are shielded.

2. Means for transmitting television images in a plurality of colors, said means comprising: a plurality of image pickup tubes; means for simultaneously focusing rays from the scene being televised upon the mosaics of said tubes; means for filtering undesired colored rays from the band of rays reaching each tube, so that each tube will receive rays that are predominantly of a selected color; means for intermittently shielding said tubes from light rays from said scene; and means for scanning the mosaics of at least all but one of said tubes during the interval in which they are shielded.

3. Means for transmitting television images in a plurality of colors, said means comprising: a plurality of image pickup tubes; means for simultaneously focusing rays from the scene being televised upon the mosaics of said tubes; means for filtering undesired colored rays from the band of rays reaching each tube, so that each tube will receive rays that are predominantly of a selected color; means for intermittently shielding said tubes from light rays from said scene; and means for successively scanning all but one color separation field during the interval in which the tubes are shielded.

4. Means for sharpening the definition in television images, said means including: at least one image pickup tube; light-interrupting means for alternately admitting light to said tube and shielding light therefrom; and means for scanning the mosaic of said tube; the operation of said scanning means and said light-interrupting means being so coordinated that at least a portion of the scanning operation takes place while the mosaic is shielded.

5. Means for transmitting television images in a plurality of colors, said means comprising: a plurality of substantially identical groups of image pickup tubes; means for simultaneously focusing the scene being televised upon the mosaics of each of said pickup tubes; individual color separating means associated with each of said tubes for filtering out some of the colored rays that would otherwise reach said tube from the scene being televised, so that said tube may respond only to rays of a selected color, one tube in each group being thus made responsive to the same color; means for successively shielding each group of tubes from the scene being focused thereon; and means for successively scanning the mosaics of each group of tubes during the interval in which they are shielded.

6. Means for transmitting television images in a plurality of colors, said means comprising: image focusing means; means for dividing the rays transmitted through said focusing means into a first beam and a second beam; means positioned in the paths of said beams for alternately intercepting them; a first group of pickup tubes for receiving rays from said first beam; light-reflecting and color-separating means so interposed in the path of said first beam that each tube in said first group receives a color separation image of a different color; a second group of pickup tubes for receiving rays from said second beam; light-reflecting and color-separating means so interposed in the path of said second beam that each tube in said second group receives a color separation image of a different color; and commutating means for controlling the effective scanning of the mosaics of all the tubes in both groups in a predetermined sequence; said beam-intercepting means and said commutating means so coordinated that said first beam is intercepted while the mosaics of the tubes in said first group are being scanned, and the second beam is intercepted while the mosaics of the tubes in the second group are being scanned.

7. Means for transmitting television images in a plurality of colors, said means comprising: image focusing means; a plurality of image pickup tubes; light-reflecting and color-separating means interposed between said focusing means and said tubes for producing respectively different color-separation images upon the mosaics of said tubes; means for alternately admitting and intercepting light rays passing from the object area to said tubes by way of said focusing means; a voltage source; and voltage commutating means electrically interposed between said source and said tubes for successively applying a voltage to said tubes for controlling the effective scanning of their mosaics; the operation of said light-admitting and intercepting means and said commutating means being so coordinated that the mosaic of at least one of the tubes is always scanned while the light rays thereto are intercepted.

8. Means for transmitting television images in a plurality of colors, said means comprising: image focusing means; a plurality of image pickup tubes; light-reflecting and color-separating means interposed between said focusing means and said tubes for producing respectively different color-separation images upon the mosaics of said tubes; means for alternately admitting and intercepting light rays passing from the object area to said tubes by way of said focusing means; a voltage source; commutating means electrically interposed between said source and said tubes for successively applying a voltage to said tubes for controlling the scanning of their mosaics, at least one of said tubes so connected to said commutating means that its mosaic is scanned one more time during each cycle than the mosaics of the other tubes in order to remove latent image signals stored therein; and switching means interposed between said transmitter and at least the tube whose mosaic is scanned the extra time; said light admitting and intercepting means, said commutating means and said switching means all being so coordinated that (*a*) light is admitted to all the tubes at least during a portion of the interval when the mosaic of said last mentioned tube is being scanned for the first time during each scanning cycle, (*b*) light is intercepted during at least another portion of the scanning cycle, and (*c*) said last mentioned tube is disconnected from the transmitter while its mosaic is being scanned for the extra time to remove said latent image signals.

9. Means for transmitting television images in a plurality of colors, said means comprising; a plurality of image pickup tubes; means for simultaneously focusing rays from the scene being televised upon the mosaics of said tubes; means for filtering undesired colored rays from the band of rays reaching each tube, so that a color separation image of a desired color will be focused upon each mosaic; instrumentalities for alternately passing and intercepting the rays proceeding from said scene to said mosaics, said instrumentalities comprising two generally opaque and coaxial discs synchronously rotating in opposite directions, each of said discs having at least one light-transmitting portion so disposed with relation to a light-transmitting portion of the other disc that both portions will register at a position in which the light rays will pass therethrough; and means for scanning the mosaics of at least all but one of said tubes during the interval in which the light rays are intercepted by the opaque portion of at least one of said discs.

10. Means for transmitting television images in a plurality of colors, said means comprising: a plurality of image pickup tubes; means for simultaneously focusing rays from the scene being televised upon the mosaics of said tubes; means for filtering undesired colored rays from the band of rays reaching each tube, so that a color separation image of a desired color will be focused upon each mosaic; and a generally opaque rotatable member positioned in the path of said rays, said member having at least one light-transmitting portion through which said rays may pass; and means for scanning the mosaics of at least all but one of said tubes during the interval in which said rays are intercepted by opaque portions of said member.

11. Means for transmitting television images in a plurality of colors, said means comprising: image focusing means; means for dividing the rays transmitted through said focusing means into a first beam and a second beam; instrumentalities positioned in the paths of both of said beams for alternately intercepting them, said instrumentalities comprising two generally opaque and coaxial discs synchronously rotating in opposite directions, each of said discs having at least two light-transmitting portions so disposed with relation to the light-transmitting portions of the other disc that open portions of both discs will permit the passage of said beams alternately; a first group of pickup tubes for receiving rays from said first beam; light-reflecting and color-separating means so interposed in the path of said first beam that each tube in said first group receives a color separation image of a different color; a second group of pickup tubes for receiving rays from said second beam; light reflecting and color-separating means so interposed in the path of said second beam that each tube in said second group receives a color separation image of a different color; and commutating means for controlling the effective scanning of the mosaics of all the tubes in both groups in a predetermined sequence; said instrumentalities and said commutating means so coordinated that said first beam is intercepted by opaque portions of said discs while the mosaics of the tubes in said first group are being scanned, and the second beam is intercepted by said portions while the mosaics of the tubes of the second group are being scanned.

12. Means for transmitting television images in a plurality of colors, said means comprising: image focusing means; means for dividing the rays transmitted through said focusing means into a first beam and a second beam; a first pair of generally opaque and coaxial discs synchronously rotating in opposite directions in the path of said first beam, each of said discs having at least one light-transmitting portion so disposed with relation to a light-transmitting portion of the other disc that both portions will register at a position in which said first beam will pass therethrough; a second pair of discs substantially like said first pair, said second pair interposed in the path of said second beam and having its light-transmitting portions relatively disposed so that they will register at a position in which said second beam will pass therethrough; a first group of pickup tubes for receiving rays from said first beam; a first set of light-reflecting and color-separating means so interposed in the path of said first beam that each tube in said first group will receive a color separation image of a different color; a second group of pickup tubes for receiving rays from said second beam; a second set of light-reflecting and color-separating means so interposed in the path of said second beam that each tube in said second group will receive a color separation image of a different color; and commutating means for controlling the effective scanning of the mosaics of all the tubes in both groups in a predetermined sequence; the aforementioned pairs of discs and said commutating means so coordinated that said first beam is intercepted by the opaque portions of said first pair while the mosaics of the tubes in said first group are being scanned, and the second beam is intercepted by the opaque portions of said second pair of discs while the mosaics of the tubes in the second group are being scanned.

13. The method of transmitting television images in natural colors which includes: passing rays of light from a scene being televised through a device for alternately passing and intercepting the said rays; then passing the said rays through light-reflecting and light-coloring means and thence to the mosaics of a plurality of pickup tubes; and scanning the mosaics of at least all but one of said tubes during the interval in which the rays are intercepted by said device.

14. The method of transmitting television images in natural colors which includes: producing color separation images simultaneously upon the mosaics of a plurality of pickup tubes; then shielding the mosaics of said tubes from rays from the scene being televised; and scanning the mosaics of at least all but one of said tubes during the interval in which rays are shielded therefrom.

15. The method of transmitting television images in natural colors which includes: producing color separation images simultaneously upon the mosaics of a first set of pickup tubes; then shielding the mosaics of said first set of pickup tubes from light while producing color separation images upon the mosaics of a second set of pickup tubes; scanning and transmitting the color separation images on the mosaics of said first set of tubes in sequential fields in an interlaced pattern during the interval when the mosaics of said set are shielded; and shielding the mosaics of said second set while scanning and transmitting the color separation images thereupon in sequential fields in an interlaced pattern identical to that in which the mosaics of the first set were scanned.

16. The method of increasing the sharpness of television images which includes: exposing the mosaic of an image pickup tube for an interval substantially less than that required for the complete scansion of one frame and shielding the mosaic while the scansion of said frame is completed.

17. The method of increasing the sharpness of natural color television images which includes: producing color separation images simultaneously upon the mosaics of a plurality of pickup tubes; then shielding said mosaics from the rays producing said color separation images during the greater part of the interval required for the scansion and transmission of a complete color frame; and scanning and transmitting the color separation images on the mosaics of said tubes in sequential color fields during respective periods of time that are spaced by substantially equal intervals.

18. The method of natural color television transmission which includes: producing color separation images simultaneously upon the mosaics of a plurality of pickup tubes while scanning and transmitting the first color field on one of said mosaics; shielding the mosaics of all of said tubes while scanning and transmitting the remaining color fields of a complete color frame; and scanning for a second time the first-mentioned color field while scanning and transmitting a corresponding field of another color in said complete color frame, said second scanning acting to dissipate the residual charge accumulated on said one of said mosaics during the interval between the scanning of each line and the completion of the scanning of said first color field.

References Cited in the file of this patent

UNITED STATES PATENTS

| | | |
|---|---|---|
| 2,530,107 | Webb | Nov. 14, 1950 |
| 2,535,552 | Schroeder | Dec. 26, 1950 |
| 2,587,006 | Smith | Feb. 26, 1952 |

FOREIGN PATENTS

| | | |
|---|---|---|
| 107,486 | Australia | June 1, 1939 |